United States Patent [19]
Ellis

[11] Patent Number: 4,863,269
[45] Date of Patent: Sep. 5, 1989

[54] WEAPON SIGHTS

[75] Inventor: Stafford M. Ellis, East Preston, England

[73] Assignee: GEC-Marconi Limited, England

[21] Appl. No.: 203,737

[22] Filed: Jun. 7, 1988

[30] Foreign Application Priority Data

Jun. 17, 1987 [GB] United Kingdom ............... 8714203

[51] Int. Cl.$^4$ ............................................. G02B 23/12
[52] U.S. Cl. ................................... 356/251; 350/538
[58] Field of Search ............... 356/251, 252; 250/333; 350/538

[56] References Cited

U.S. PATENT DOCUMENTS

| 4,417,814 | 11/1983 | Doliber | 356/252 |
| 4,563,061 | 1/1986 | Ellis | 350/538 X |
| 4,582,400 | 4/1986 | Lough | 350/538 |

FOREIGN PATENT DOCUMENTS

| 1456333 | 11/1976 | United Kingdom | 356/251 |
| 2108702 | 5/1983 | United Kingdom | 350/174 |

Primary Examiner—Davis L. Willis
Assistant Examiner—Matthew W. Koren
Attorney, Agent, or Firm—Kirschstein, Ottinger, Israel & Schiffmiller

[57] ABSTRACT

A night vision gunsight providing an intensified image of an external scene and an image of an illuminated reticle (13,88) superimposed on the user's (14) direct view of the external scene through the sight. The sight utilizes an eyepiece (39) through which the user (14) views the external scene directly and which also incorporates an internal curved surface (57) possessing both light reflecting and light transmitting properties which serves as a collimating reflector for light rays from an image intensifier (31) viewing the external scene. Light from the illuminated reticle (13,88) may also be collimated and reflected to the user's eye (14) by the curved surface (57) in the eyepiece (39), or alternatively by a similar surface (22) incorporated in an optical element (21,23) in the user's (14) line of sight through the eyepiece (39).

8 Claims, 2 Drawing Sheets

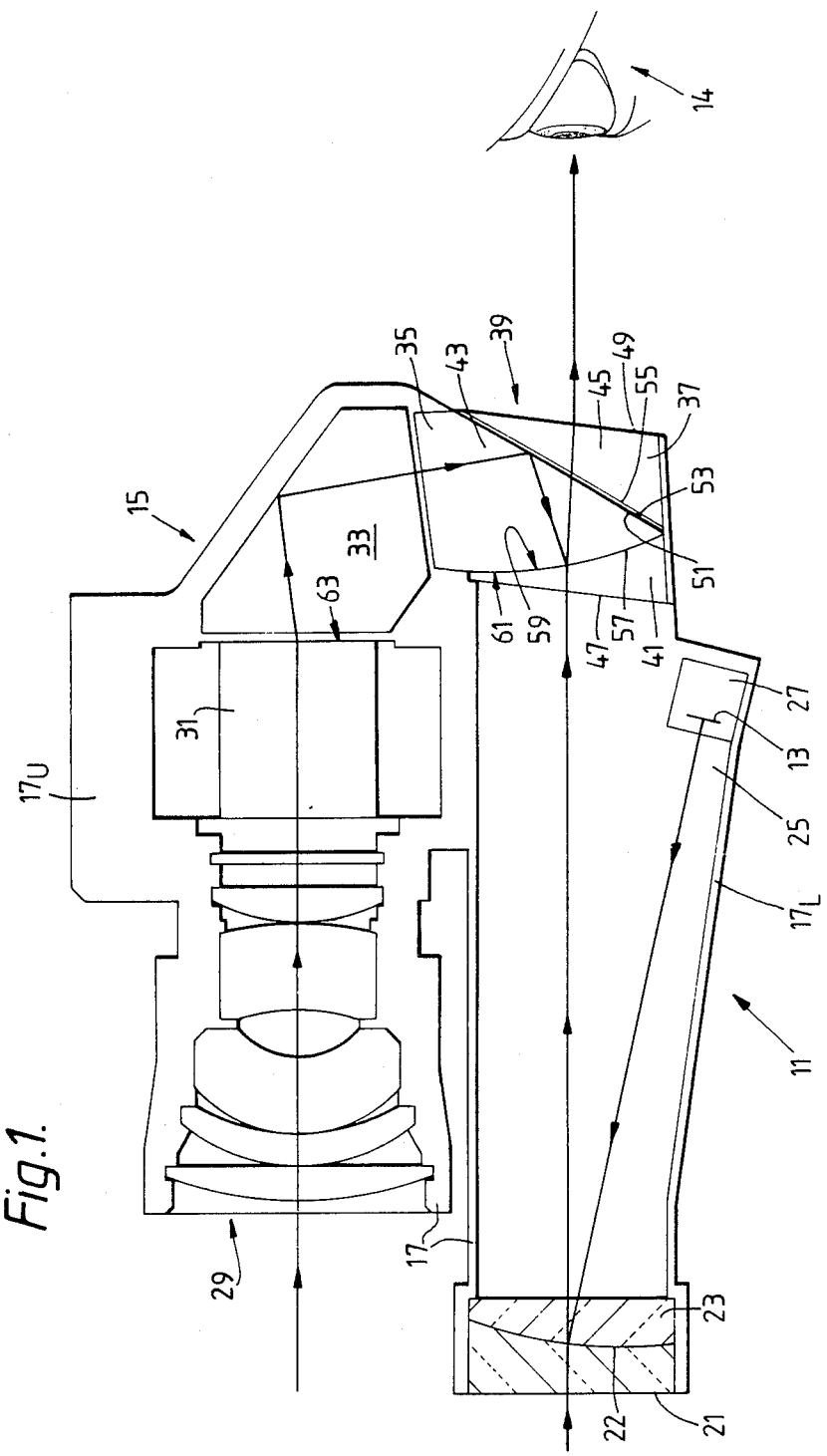

U.S. Patent Sep. 5, 1989 Sheet 2 of 2 4,863,269
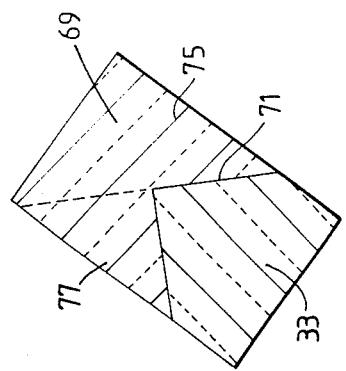
Fig. 3.
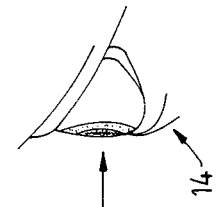
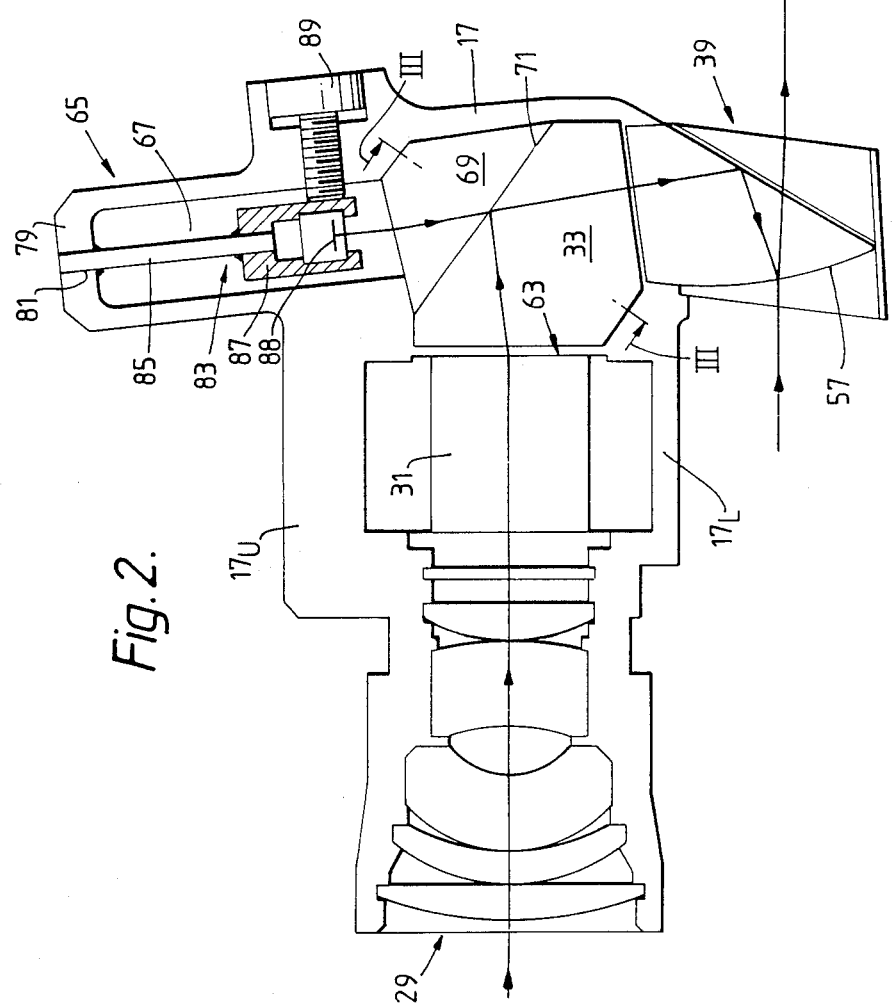
Fig. 2.

WEAPON SIGHTS

This invention relates to weapon sights.

More particularly, the invention relates to weapon sights for use at night, i.e. incorporating an image intensifier.

It is an object of the present invention to provide such a weapon sight which is sufficiently light and compact as to be used on a hand-held weapon such as a rifle.

According to the present invention there is provided a weapon sight comprising: a frame part and supported with respect to said frame part, means for providing a virtual image at infinity of a reticle for facilitating aiming the weapon and an optical projector comprising: an image intensifier; and optical means arranged in conjunction with said image intensifier so as to project rays of an intensified image representative of a scene ahead of a user to a user's eye position, said optical means including: a body of light refractive material having: an input surface; flat and parallel fore and aft further surfaces; and an interface between fore and aft portions of the body, the said interface being concavely curved towards the said aft further surface and having both light reflective and light transmissive properties, the arrangement being such that said rays of an intensified image enter said body at said input face, are totally internally reflected forwardly towards said interface, are reflected collimated from said interface rearwardly towards said aft further surface; and are transmitted by said aft further surface to the user's eye position to provide a virtual image at infinity of said intensified image in register with the user's view of said scene through said body and congruent with said virtual image of said reticle.

Preferably, said optical means further includes a roof prism located between said image intensifier and said body of light refractive material.

In such an arrangement said means for providing a virtual image at infinity of a reticle comprises: a composite prism of which said roof prism is one part and a second part of which is a prism complementary with the roof prism and positioned so that the roof surfaces of the roof prism and corresponding surfaces of the second part are in intimate optical contact save for the presence of a coating therebetween possessing both light transmissive and light reflective properties; and a reticle supported at the same optical distance from said interface of said body of light refractive material as an output face of the image intensifier, at which output face is formed said intensified image, but along a path extending through both said parts of said composite prism.

Alternatively, said means for providing a virtual image at infinity of a reticle may comprise; a reticle; and means having both light reflective and light transmissive properties and located in the direction of tee user's forward view through the body to reflect light rays from said reticle to said user's eye position via said body.

The virtual image of said reticle may be arranged to be boresighted by means of two screws in, and threadingly engaged with, said frame part so that the axes of the screws are mutually perpendicular, the end of each screw bearing against a holder for the reticle resiliently mounted on said frame part.

Two embodiments of the present invention will now be described, by way of example, with reference to the accompanying drawings in which:

FIG. 1 is a diagrammatic view from the side of the first embodiment;

FIG. 2 is a diagrammatic view from the side of the second embodiment; and

FIG. 3 is a cross-section on the line III—III in FIG. 2.

Referring to FIG. 1, the first embodiment, which is a rifle sight, comprises means 11 for providing a virtual image at infinity of an illuminated reticle 13 and an arrangement 15 for providing an intensified image representative of a scene ahead of a user 14 in register with the user's view of the scene and congruent with the virtual image of the reticle 13.

A housing 17 of complex shape has a generally tubular lower portion $17_L$ adapted to be mounted, by means not shown, on a rifle barrel (not shown), the housing portion $17_L$ containing optical elements 21,23 defining an interface concavely curved in the general direction towards the rear end of the housing 17, one or the other of the two complementary curved surfaces of the elements 21,23 carrying a coating 22 possessing both light transmissive and light reflective properties. The curved coating 22 has a principal focal plane within a side pocket 25, the reticle 13, in a reticle holder 27, being located in the side pocket 25 in a plane coincident with the principal focal plane of the coating 22. Accordingly with the reticle 13 illuminated, rays therefrom are reflected collimated by the coating 22 to produce a virtual image at infinity of the reticle 13 for viewing by the user 14. The reticle's virtual image is, in use, boresighted with the rifle barrel by means (not shown) which may essentially be as described hereinafter with reference to the embodiment of FIG. 2.

The collimated sight constituted by the means 11 whilst of service in good visibility conditions is of substantially no use at night or in other poor ambient light conditions.

The arrangement 15 incorporates means whereby night targets may be readily observed with the boresighted image of the illuminated reticle 13 superimposed, apparently, thereon.

The upper portion $17_U$ of the housing 17 has an objective 29, an image intensifier 31, and a roof prism 33. Supported by the housing 17 with an upper part 35 within the upper housing portion $17_U$ and a lower part 37 within the lower housing portion $17_L$ there is an eyepiece 39.

As shown, the eyepiece 39 is a body of light refractive material having three elements 41, 43 and 45, respectively. The element 41 has a flat front surface 47 and the element 45 a flat rear surface 49, the surfaces 47 and 49 being in parallel planes. The intermediate element 43 has an inclined and flat rear surface 51 parallel to and spaced by a small air gap 53 from the inclined and flat forward surface 55 of the element 45.

The elements 41 and 43 are in intimate optical contact at a curved interface 57, one or the other of the curved complementary surfaces, 59 or 61 of the elements 41,43 respectively, being provided with a coating, such, for example, as a dichroic coating, possessing both light reflective and light transmissive properties, optical contact at the interface being ensured by an optical cement between the two elements 41,43.

The reflective interface 57 has a principal focal plane substantially coincident with the output face 63 of the image intensifier 31, the inverted bright virtual image of the scene ahead being developed thereat. As a consequence, the bright image appears to the user 14 in a plane congruent with the virtual image plane of the reticle 13. The arrangement 15 is such that the bright virtual image presented at the output face 63 appears in register with the scene ahead viewed through the eyepiece 39, orientation of the bright virtual image being preserved by virtue of the characteristic reflective properties of the roof prism 33.

Referring to FIGS. 2 and 3, in the second embodiment, which is essentially identical to the first embodiment apart from the means for providing a virtual image at infinity of a reticle, the upper part 17$_U$ of the housing 17 has an upstanding portion 65 into which a cylindrical cavity 67 extends from the housing interior.

A space between the roof prism 33 and interior surfaces of the walls of the housing 17 is occupied by a second complementary. prism 69 which straddles the roof portion 71 of the roof prism 33, having a roof shaped recess 73 complementary to the said roof prism 33 roof portion 71. The roof prism 33 and second prism 69 together comprise a composite prism, the roof and second prisms 33,69 being in intimate optical contact save for the presence of a coating therebetween possessing both light reflective and light transmissive properties.

To facilitate its manufacture the second prism 69, is formed from two elements 75,77 bonded together by an optical cement (FIG. 3).

The end wall 79 of the upstanding portion 65 is pierced by a passage 81. The cavity 67 houses a reticle holder 83 having a stiff wire spring part 85 and a receptacle part 87. The wire spring part 85 is secured at one end to the receptacle part 87 and at the other end to the end wall 79 extending into the passage 81.

A reticle 88 is supported within the holder 83 at a position with respect to the curved interface 57, optically equivalent to the position of the output face 63 of the image intensifier 31.

Accordingly rays from the reticle 88, illuminated by means not shown, passing through the second prism 69 then the body of the roof prism 33, are reflected in the eyepiece 39 at the interface 57 to provide a virtual image of the reticle at infinity for the user 14. As with the first embodiment, the bright image at the output face 63, being a representation of the scene ahead perceived at the objective 29, is reflected in the eyepiece 39 to provide a virtual image at infinity, the bright image being in register with the user's 14 view of the scene ahead through the eyepiece 39, the virtual image of the reticle appearing congruent with the virtual bright image.

The reticle 88 is boresighted by means of two screws 89, one of which is shown. The screws 89 respectively threadingly engage the wall of the upstanding portion 65 of the housing 17 at right angles to one another; and bear against the reticle holder 83. Boresighting is effected by screw action to deflect the reticle holder 83 and hence the reticle 88 so that the virtual image of the reticle is correctly positioned with regard to the barrel of the rifle when the sight is mounted thereon.

I claim:

1. A weapon sight comprising: a frame part and supported by said frame part, means for providing a virtual image at infinity of a reticle for facilitating aiming a weapon on which said weapon sight is mountable, and an optical projector comprising: an image intensifier; and optical means arranged in conjunction with said image intensifier so as to project rays of an intensified image representative of a scene ahead of a user to a user's eye position, said optical means including: a body of light refractive material having: an input surface; flat and parallel fore and aft further surfaces; and an interface between fore and aft portions of the body, the said interface being concavely curved towards the said aft further surface and having both light reflective and light transmissive properties, the arrangement being such that said rays of an intensified image enter said body at said input face, are totally internally reflected forwardly towards said interface, are reflected collimated from said interface rearwardly towards said aft further surface; and are transmitted by said aft further surface to the user's eye position to provide a virtual image at infinity of said intensified image in register with the user's view of said scene through said body and congruent with said virtual image of said reticle.

2. A weapon sight according to claim 1 wherein said optical means further includes a roof prism located between said image intensifier and said body of light refractive material.

3. A weapon sight according to claim 2 wherein said means for providing a virtual image at infinity of a reticle comprises: a composite prism of which said roof prism is one part and a second part of which is a prism complementary with the roof prism and positioned so that roof surfaces of the roof prism and corresponding surfaces of the second part are in intimate optical contact save for the presence of a coating therebetween possessing both light transmissive and light reflective properties; and a reticle supported at the same optical distance from said interface of said body of light refractive material as an output face of the image intensifier at which output face is formed said intensified image, but along a path extending through both said parts of said composite prism.

4. A weapon sight according to claim 1 wherein said means for providing a virtual image at infinity of a reticle comprises: a reticle; and means having both light reflective and light transmissive properties and located in the direction of the user's forward view through the body to reflect light rays from said reticle to said user's eye position via said body.

5. A weapon sight according to claim 4 wherein said means having both light reflective and light transmissive properties comprises a coating sandwiched between complementary surfaces of fore and aft optical elements having parallel planar external surfaces in the direction of the user's forward view.

6. A weapon sight according to claim 5 wherein said coating is concavely curved towards said body and said reticle is located in the principal focal plane of said curved coating so that said coating reflects collimated light rays from said reticle through said body of light refractive material to said user's eye position.

7. A weapon sight according to claim 1 wherein the virtual image of said reticle is boresighted by means of two screws in, and threadingly engaged with, said frame part so that the axes of the screws are mutually perpendicular, the end of each screw bearing against a holder for the reticle resiliently mounted on said frame part.

8. A weapon sight according to claim 1 wherein in said body: said aft portion comprises fore and aft parts having respective aft and fore planar complementary faces, the total internal reflection forwardly towards said interface being at said aft face of said fore part; said input face is constituted by an external planar face of said fore part; said flat and parallel fore and aft further surfaces are constituted respectively by the fore face of said fore portion and the aft face of said aft part of said aft portion; and said interface is between the aft face of said fore portion and the fore face of said fore part of said aft portion.

* * * * *